Aug. 10, 1965   P. N. VAN SCHAIK ETAL   3,199,626
INSTANT BONDING ATTACHMENT MECHANISM
Filed June 3, 1964   5 Sheets-Sheet 1
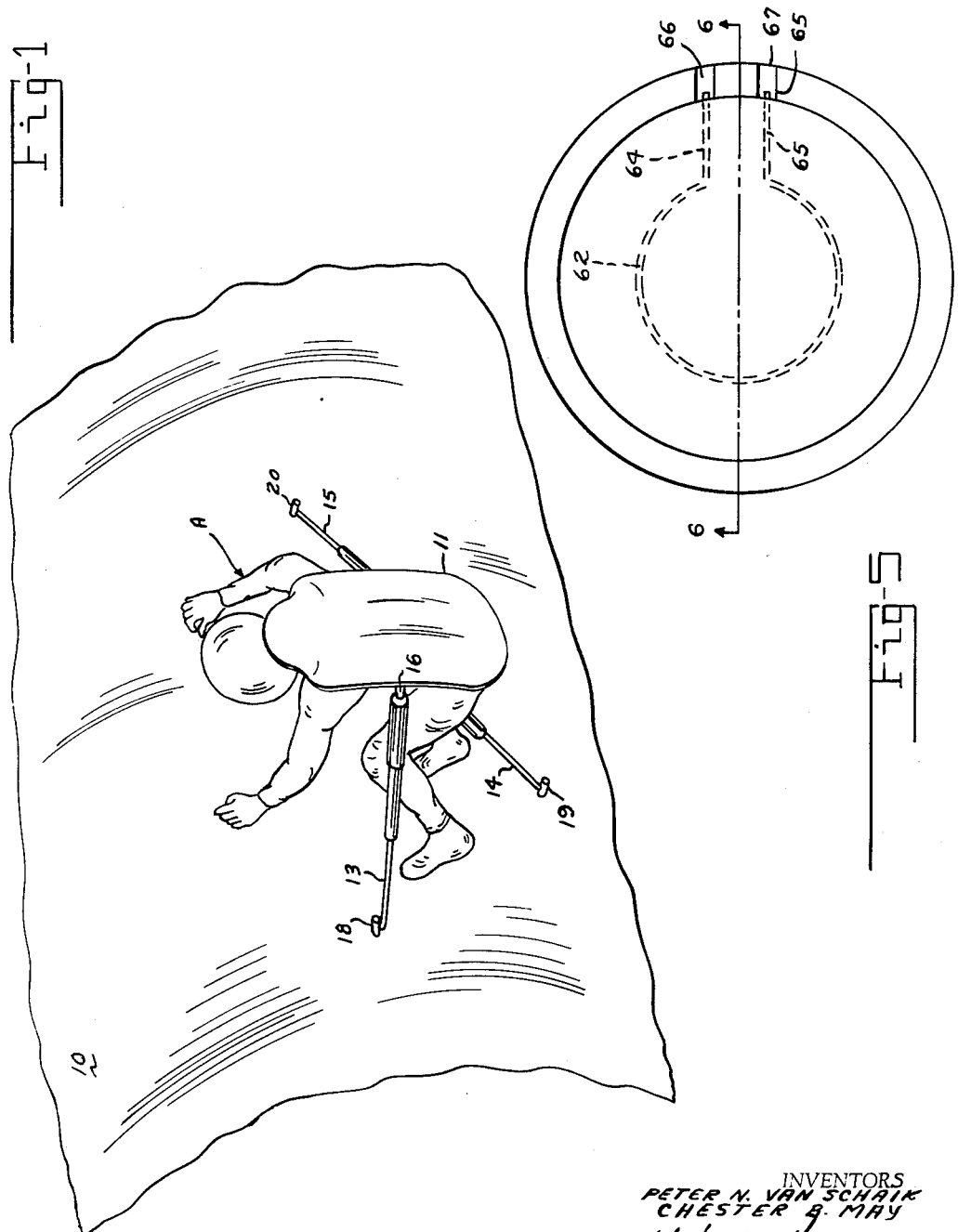
INVENTORS
PETER N. VAN SCHAIK
CHESTER G. MAY
BY
ATTORNEY
AGENT

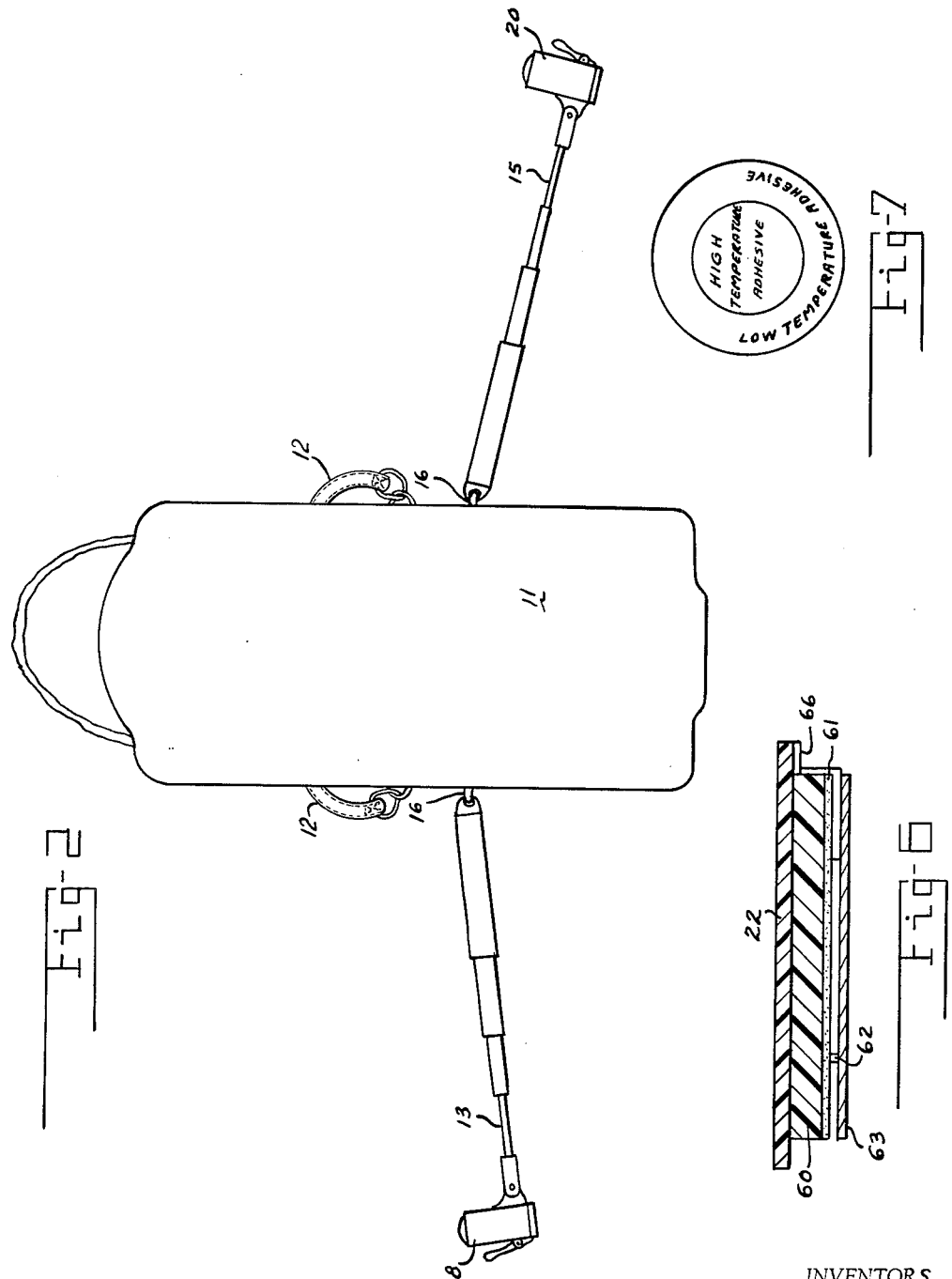

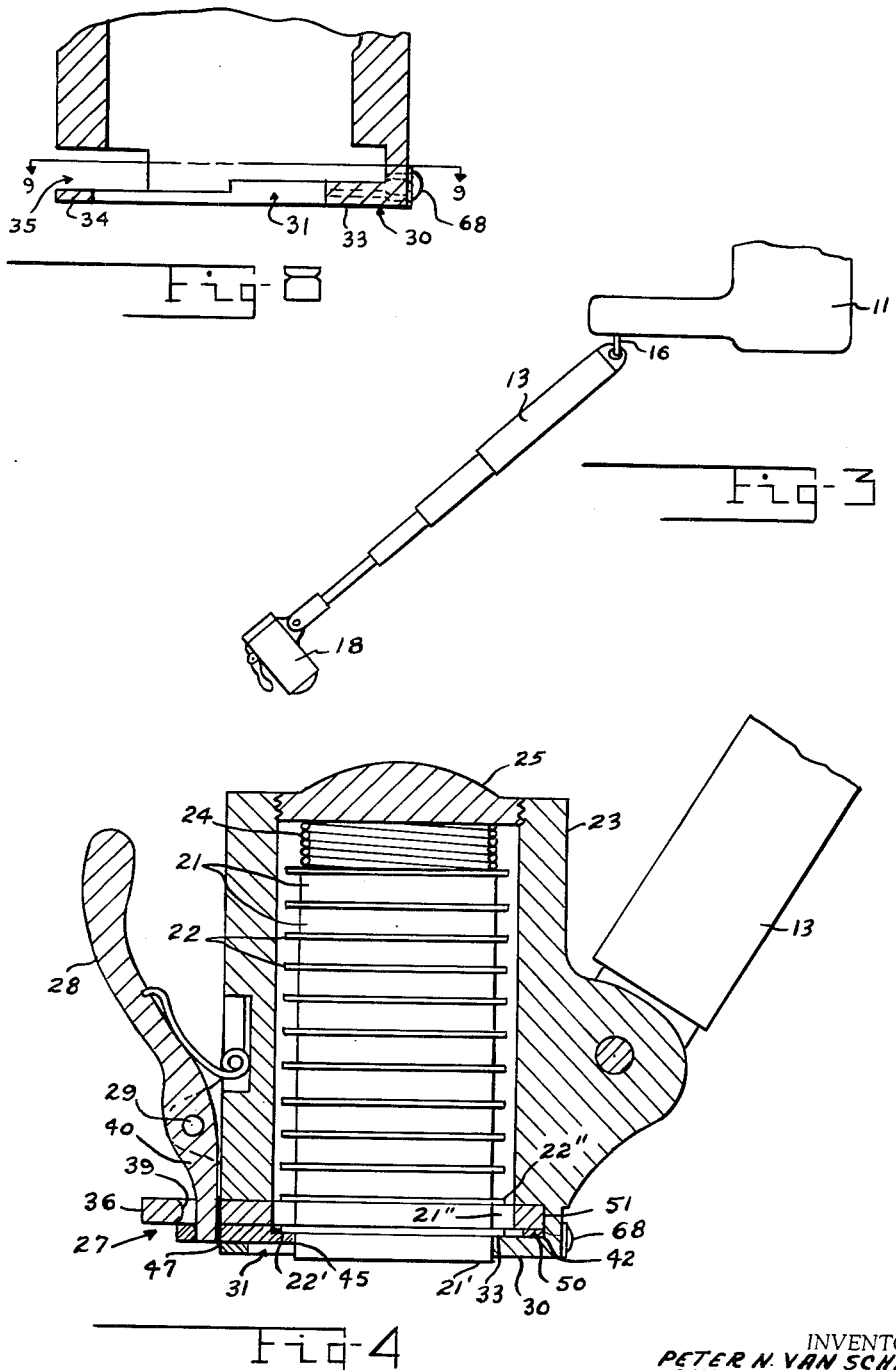

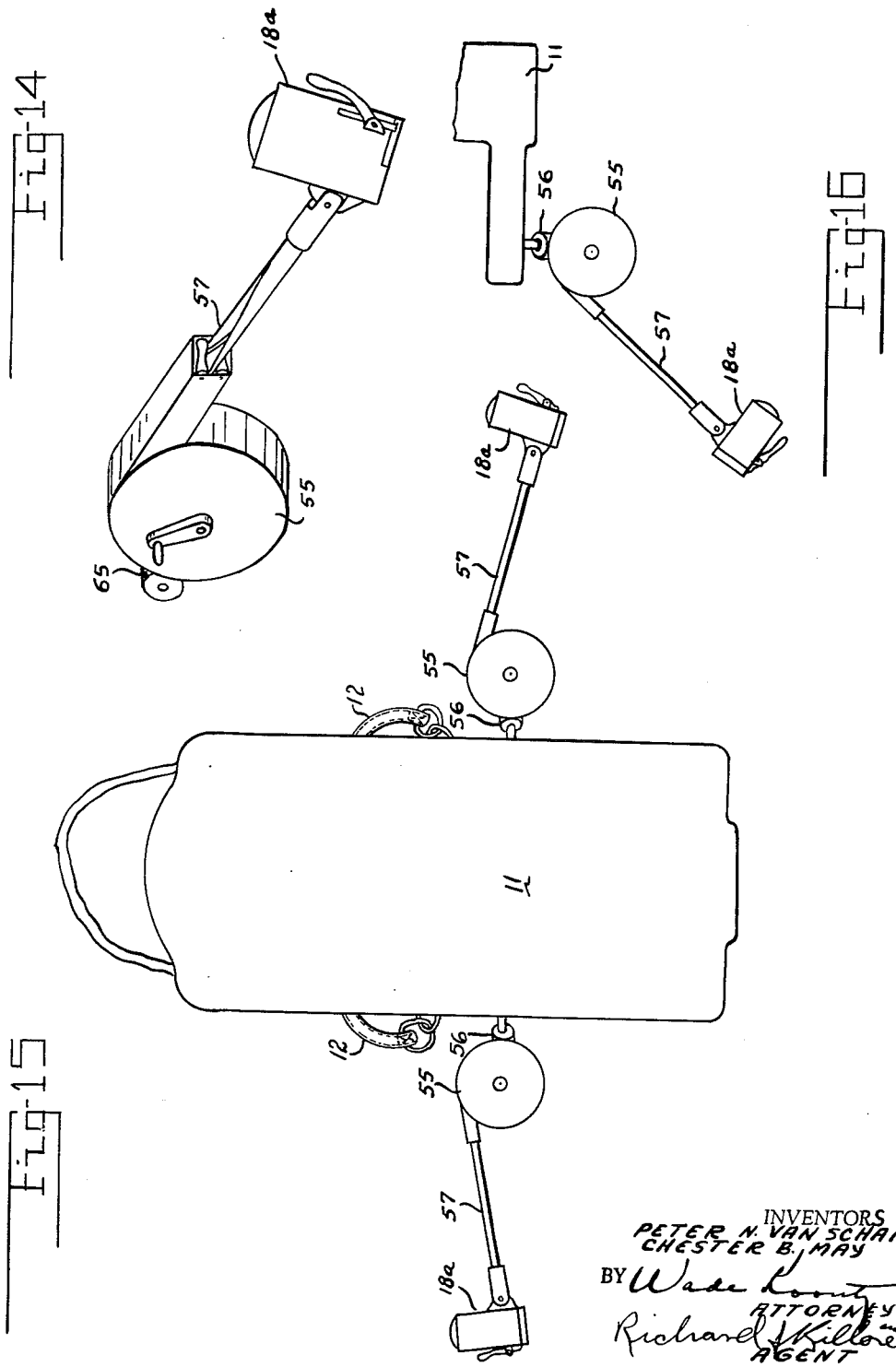

United States Patent Office 3,199,626
Patented Aug. 10, 1965

1

3,199,626
INSTANT BONDING ATTACHMENT
MECHANISM
Peter N. Van Schaik and Chester B. May, Dayton, Ohio,
assignors to the United States of America as represented
by the Secretary of the Air Force
Filed June 3, 1964, Ser. No. 372,432
4 Claims. (Cl. 182—3)
(Granted under Title 35, U.S. Code (1952), sec. 266)

The invention described herein may be manufactured and used by or for the United States Government for governmental purposes without the payment to us of any royalty thereon.

This invention relates to a system for attaching a man to a surface so that he can perform work in a weightless environment.

One object of the invention is to provide a system for attaching a man to a surface of a space vehicle which makes it unnecessary to provide attachment fittings on the outside surface of the space vehicle.

Another object of the invention is to provide a system for readily attaching a man to the surface of a space vehicle adjacent the work site and for easily releasing him from the vehicle surface when the work is completed.

These and other objects will be more fully understood from the following detailed description taken with the drawing wherein:

FIG. 1 is a schematic perspective view showing the support system of the invention;

FIG. 2 is a plan view of the device of FIG. 1 showing one manner for attaching two of the arms to the propulsion unit;

FIG. 3 shows a partial cut-away side view of the device of FIG. 2 showing one manner for attaching the third arm to the propulsion unit;

FIG. 4 is a cross-sectional view of the dispenser mechanism for the device of FIG. 1;

FIG. 5 shows an enlarged bottom view of one of the adhesive wafers used in the device of FIG. 4;

FIG. 6 is a sectional view of the device of FIG. 5 along the line 6—6;

FIG. 7 shows an arrangement of the adhesives which may be used with the device of FIGS. 5 and 6;

FIG. 8 shows a partial cross-sectional view of the lower half of the container for the dispenser mechanism taken at 90° to the section of FIG. 4;

FIG. 14 is a perspective view of a modification of the arm member for the device of FIG. 1;

FIG. 15 shows a plan view of arm members such as shown in FIG. 14 attached to the propulsion unit; and FIG. 16 is a partial cut-away side view of the propulsion unit of FIG. 15 showing the attachment of the third arm member.

Figure 9:
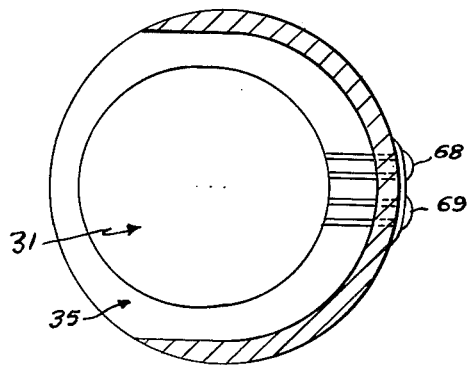
FIG. 9 is a full section view of the bottom of the container of FIG. 8 along the line 9—9.

In performing extra-vehicular maintenance on an orbiting satellite, it is necessary for the man to attach himself to the vehicle adjacent the work site so that he can apply force and torques in his weightless environment.

If attachment fittings were provided on the satellite it would be necessary to locate these fittings every few feet on the satellite surface.

2

This invention provides a more flexible system for attaching a man to the outer surface of an orbiting satellite which is also more economical than locating fittings every few feet on the satellite surface.

According to this invention, adhesive pads are stored in dispensing mechanisms which are attached to extendible arms. The extendible arms are attached to the propulsion unit secured to the back of the man. The adhesive pads consist of thermal setting adhesives bonded to thin discs. When the adhesive pad is pressed against a surface and heated to activate the adhesive it permanently bonds itself to the surface. To release the man from the work site the adhesive pad is released from the dispensing mechanism.

With reference to FIG. 1 of the drawing wherein a portion of the exterior surface of a space vehicle is indicated generally at 10, an astronaut or space mechanic indicated generally at A is secured to a propulsion unit indicated at 11 by any well known means such as a harness shown schematically at 12 in FIGS. 2 and 15. Three extendible telescoping arms, 13, 14 and 15, shown in greater detail in FIGS. 2 and 3 are attached to the propulsion unit by means of a pivotable connection 16, one of which is shown in FIG. 1. Pad dispensing mechanisms, 18, 19 and 20, as will be described with respect to FIG. 4, are located at the ends of each of the arms 13, 14 and 15, respectively, and are pivotably connected thereto.

Figure 10:
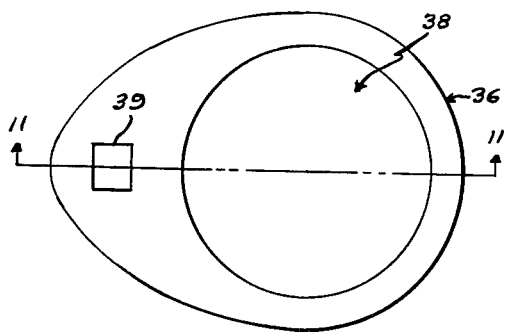
FIG. 10 is a top view of the upper member of the dispensing mechanism in the device of FIG. 4.
Figure 13:
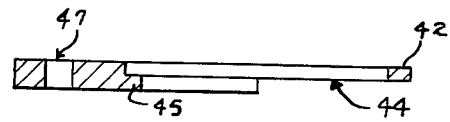
FIG. 13 is a sectional view of the device of FIG. 12 along the line 13—13.

Each dispensing mechanism 18, 19 and 20, as shown in FIG. 4, contains a plurality of wafers 21 for securing the arms 13, 14 and 15 to the space vehicle. The wafers are held in a hollow tubular container 23. A spring 24 is located between the wafers 21 and the container closure member 25 which is threaded into the tubular container 23. The spring 24 urges the wafers against the dispensing mechanism shown generally at 27 which is operated by a lever 28 pivotable at 29. The bottom 30 of the container 23 has a hole 31 therein with its center displaced from the center of container 23 as shown in FIGS. 8 and 9. The bottom of the container has a first portion 33 of greater thickness than the second portion 34 as shown in FIG. 8. The container 23 also has an opening 35 for receiving the dispensing mechanism 27. Dispensing mechanism 27 has a first member 36 shown in FIGS. 10 and 11 with a hole 38 normally concentric with container 23 and a hole 39 for receiving the operating projection 40 attached to lever 28. The second member 42 of the operating mechanism 27, shown in FIGS. 12 and 13 has an oval shaped hole 44 therein and an inwardly projecting member 45. A second opening 47 receives the operating projection 40 attached to lever 28.

The wafers 12 consist of a backing plate 22 which may be plastic, fiberboard or other insulating material. When pressure sensitive adhesives are used the plate 22 may be made of a metal such as aluminum. A polyester or polyurethane foam pad 60 with a density of approximately 5 lbs./cu. ft. is secured to the plate 22 by any well known means such as an adhesive. A hot melt adhesive layer 61 such as mixture of one part Versamid 900, and three parts Vershon 1112 is coated on foam pad 60. A pyrofuse braid 62 is then secured to the adhesive layer 61. This is then covered with a pyrofuse foil layer 63 secured to the pyrofuse braid 62 and layer 61 with an adhesive. Electrical leads 64 and 65 from the pyrofuse braid are brought out to terminals 66 and 67 shown in FIG. 5. Terminals 66 and 67 make contact with input leads 68 and 69 shown in FIG. 9. Other arrangements for making contact with the pyrofuse braid 62 may be provided; for example, radially displaced annular leads on the plate 22 with corresponding contacts on the bottom member 30 could be used. In some uses of the device low temperature adhesives may be desired at 61. One that has been tested and found adequate is a mixture of 12 parts Versamid 100 with 88 parts epoxy 828. Both high and low temperature adhesives may be provided on the same wafer by locating them in the manner shown in FIG. 7.

In the operation of the device of the invention the propulsion unit 11 is secured to the astronaut. Once outside the spacecraft the astronaut propels himself to the work site. He then attaches one of the arms by bringing the bottom pad 21' into contact with the spacecraft surface and activates the adhesive by touching the contacts of a battery carried by the astronaut to the leads 68 and 69. The current passing through the pyrofuse braid 62 energizes the pyrofuse foil 63 and heats the thermosetting adhesive 61 to secure the wafer to the vehicle surface. The corresponding telescoping arm is then extended and a second arm is attached in the same manner. The third arm is then attached in the same manner as the other two. When it is desired for the astronaut to release himself from the work site, lever 28 is moved toward container 23. Hole 39 is made larger than hole 47 so that member 36 does not start to move until portion 50 of member 42 contacts the plate 22' on wafer 21'. Portion 51 of member 36 is then moved under plate 22'' of wafer 21'' to keep it from moving down until wafer 21' has been released. The initial movement of member 42 moves the projection 45 from under plate 22' on wafer 21'. Further movement of lever 28 then pushes wafer 21' off of the portion 33 of bottom 30. At the same time portion 51 of member 36 is moved under plate 22''. When the wafer 21' is aligned with hole 31 in dispenser the container 23 can be pulled free thus releasing the corresponding arm from the space vehicle. The wafer 21' is left attached to the space vehicle surface. When the lever 28 is returned to its original position edge 51 is moved from under plate 22'' and wafer 21'' is free to move down under the action of spring 24. The arm is then ready for attachment to a new work site.

Figure 11:
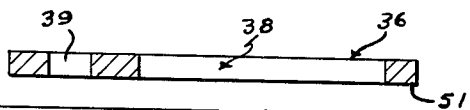
FIG. 11 is a sectional view of the device of FIG. 10 along the line 11—11.
Figure 12:
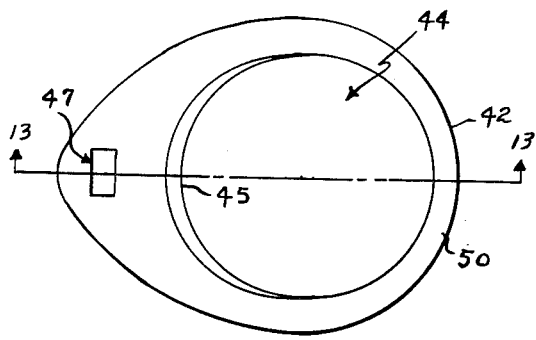
FIG. 12 is a top view of the lower dispensing member of the device of FIG. 4.

While the device of FIG. 1 has been shown to have telescoping arms other means may also be used such as the extendible tape as shown in FIG. 11. These tapes may be unfurlable tapes as described in the paper "Unfurlable Metal Structures for Spacecraft," by John D. MacNaughton, a paper presented to the Astronautics Symposium, Canadian Aeronautics and Space Institute, March 1963. In this case the tape housing 55 is attached to the propulsion unit by the pivotable connection 56 as shown in FIGS. 15 and 16 which is the same as in FIGS. 1, 2 and 3. The dispensing mechanism 18a is connected to the tape 57 which is wound around a reel, not shown, within housing 55.

Though the extendible arms have been disclosed as being attached to the propulsion unit they could be attached to other body support means such as a belt. Also pressure sensitive adhesives or other controllable adhesives could be used, wherein the pressure would be applied with the aid of the propulsion unit.

There is thus provided a system for attaching a man to a surface so that he can perform work in a weightless environment.

While certain specific embodiments have been described it is obvious that numerous changes may be made without departing from the general principles and scope of the invention.

We claim:
1. An apparatus for attaching a man to a working surface and for releasing him therefrom, comprising: a body support member, means for attaching a man to said support member, a plurality of extendible arms pivotably attached to said support member, a wafer dispensing mechanism at the end of each of said arms remote from said body support member, a plurality of controllable adhesive wafer elements in each of said dispensing mechanisms, means for activating said controllable adhesive elements to thereby secure a wafer in said dispensing mechanism to the working surface, means on each of said dispensing mechanisms for releasing the wafers adhesively secured to said working surface when it is desirable to release the man from said working surface and for permitting a new wafer to move into its place in the dispensing mechanism.

2. An apparatus for attaching a man to a working surface and for releasing him therefrom, comprising: a body support member, means for attaching a man to said support member, a plurality of extendible arms pivotably attached to said support member, a wafer dispensing mechanism at the end of each of said arms remote from said body support member, a plurality of thermal setting adhesive wafer elements in each of said dispensing mechanisms, means for activating said thermal setting adhesive to thereby secure a wafer in said dispensing mechanism to the working surface, means on each of said dispensing mechanisms for releasing the wafers adhesively secured to said working surface when it is desirable to release the man from said working surface and for permitting a new wafer to move into its place in the dispensing mechanism.

3. An apparatus for attaching a man to a working surface and for releasing him therefrom, comprising: a propulsion unit; means for attaching a man to said propulsion unit; a plurality of extendible arms pivotally attached to said propulsion unit; a wafer dispensing mechanism at the end of each of said arms remote from said body support member; said dispensing mechanisms including a cylindrical body partially closed at one end; a plurality of controllable adhesive wafer elements in each of said dispensing mechanisms; closure means for holding said adhesive wafers in said cylindrical body; spring means, located between said closure means and said wafers for urging said wafers toward said partially closed end; a wafer dispensing mechanism within said cylindrical body adjacent said partially closed end; means for activating said controllable adhesive to thereby secure a wafer in said dispensing mechanism to the working surface; and means for operating said dispensing mechanism to release the man from said working surface and for permitting a new wafer to move into its place in the dispensing mechanism.

4. An apparatus for attaching a man to a working surface and for releasing him therefrom, comprising: a propulsion unit; means for attaching a man to said propulsion unit; a plurality of extendible arms pivotally attached to said propulsion unit; a wafer dispensing mechanism at the end of each of said arms remote from said body support member; said dispensing mechanisms including a cylindrical body partially closed at one end; a plurality of thermal setting adhesive wafer elements in each of said dispensing mechanisms; closure means for holding said adhesive wafers in said cylindrical body; spring means, located between said closure means and said wafers for urging said wafers toward said partially closed end; a wafer dispensing mechanism within said cylindrical body adjacent said partially closed end; means for activating said thermal setting adhesive to thereby secure a wafer in said dispensing mechanism to the working surface; and means for operating said dispensing mechanism to release the man from said working surface and for permitting a new wafer to move into its place in the dispensing mechanism.

References Cited by the Examiner

UNITED STATES PATENTS

| | | | |
|---|---|---|---|
| 900,819 | 10/08 | Aylsworth | 221—185 X |
| 2,317,346 | 4/43 | Reith | 182—4 |
| 2,567,089 | 9/51 | Walsh | 221—279 X |
| 2,581,772 | 1/52 | Rose | 182—4 |

HARRISON R. MOSELEY, *Primary Examiner.*